Dec. 8, 1931.  C. J. RAMSBURG  1,835,182
GAS TREATING PROCESS AND APPARATUS
Filed July 23, 1925   6 Sheets-Sheet 1

INVENTOR
Charles J. Ramsburg,
BY
Munday, Clarke & Carpenter
ATTORNEYs.

Dec. 8, 1931. C. J. RAMSBURG 1,835,182
GAS TREATING PROCESS AND APPARATUS
Filed July 23, 1925 6 Sheets-Sheet 3

INVENTOR
Charles J. Ramsburg,
BY
Munday, Clark & Carpenter
ATTORNEYS

Dec. 8, 1931.  C. J. RAMSBURG  1,835,182
GAS TREATING PROCESS AND APPARATUS
Filed July 23, 1925   6 Sheets-Sheet 6

INVENTOR
Charles J. Ramsburg
BY
Munday, Clarke and Carpenter
ATTORNEYS

Patented Dec. 8, 1931

1,835,182

UNITED STATES PATENT OFFICE

CHARLES J. RAMSBURG, OF PITTSBURGH, PENNSYLVANIA, ASSIGNOR TO THE KOPPERS COMPANY, OF PITTSBURGH, PENNSYLVANIA, A CORPORATION OF PENNSYLVANIA

GAS TREATING PROCESS AND APPARATUS

Application filed July 23, 1925. Serial No. 45,674.

The invention relates to a process of purifying coal gas and contemplates as its essential object the employment of a hygroscopic medium such as acid of relatively high concentration for drying and removing the moisture from the gas, and utilizing the acid which has become diluted in the drying operation, for the removal of ammonia from the gas prior to the drying operation.

The principal object of the invention is to provide a method and apparatus whereby coal gas may be completely deprived of its moisture content by means of a hygroscopic medium, such as sulphuric or phosphoric acid, having an affinity for moisture, whereby the dried coal gas may be thereafter distributed throughout natural gas systems, and employed for the same purposes and in the same manner as now obtains in the sole use of natural gas.

A further object of the invention is to provide a method and apparatus of the character described whereby the hygroscopic medium employed for drying the gas, is subsequently utilized for removing ammonia from the gas, thereby rendering the invention economical and practical in its nature and enabling it to be carried out commercially without unwarranted expense.

In the practice of the invention, the ammonia is removed from the coal gas in the form of crystalline ammonia salts of the particular hygroscopic acid employed, for instance, as ammonium sulphate or ammonium phosphate. The removal of the ammonia is preferably effected by direct contact of the gas with the acid which has been diluted by the drying operation, and prior to the direct contact of the gas with the concentrated acid employed for the moisture removal.

In the gas industry of this country, and more especially in the districts where natural gas has been the ordinary gas fuel, the use of the same is becoming restricted by reason of the gradual failure of the sources of supply. This has resulted in increasing quantities of coal gas being mixed with the natural gas in order to maintain a constant or an increased supply to satisfy existing requirements in these districts. This stated practice of mixing the coal gas with the natural gas has been found to be attended by serious disadvantages. These consist chiefly in that the distribution systems which have been installed solely for natural gas were not designed in anticipation of any depletion of the natural gas supply, and therefore were not provided with means for the removal of condensed moisture incident to the manufacture and admixture of coal gas. It is necessary to remove such moisture from the coal gas before mixing the same with natural gas, or before the coal gas is passed solely into distribution systems designed for accommodating only natural gas.

There also exist today other uses for manufactured coal gas which initially require removal of moisture from the gas. Certain particular instances are the extraction of ethylene and similar constituents from coal gas, and the separation of hydrogen from the residuary constituents of coal gas. When solid absorbents are employed to remove light oils, benzols, or other constituents or impurities from the gas, it is first necessary to completely dehydrate the coal gas.

Methods which have been practiced in the past for removing the moisture from coal gas, for the purposes above stated, have been carried out at great expense with the result that these known methods of drying the gas cannot be practiced economically and commercially on a large scale due to the prohibitive expense.

The present invention contemplates the provision of a method and apparatus whereby the moisture is removed from the coal gas for the purposes above stated, in a practical and economical manner thereby enabling the dehydrating process to be carried out commercially on a large scale. The invention provides a simplified system for removing first the ammonia and subsequently all of the moisture from the coal gas by means of the same hygroscopic liquid, thereby enabling the operation of dehydration to be carried out commercially at a minimum cost of material and apparatus.

In addition to the general objects recited above, the invention includes among its objects such other improvements and advantages in construction and operation as are found to obtain in the structures and devices hereinafter described or claimed.

In the accompanying drawings, forming a part of this specification, and showing, for purposes of exemplification, a preferred form and manner in which the invention may be embodied and practiced, but without limiting the claimed invention specifically to such illustrative instance or instances:

Figure 1:
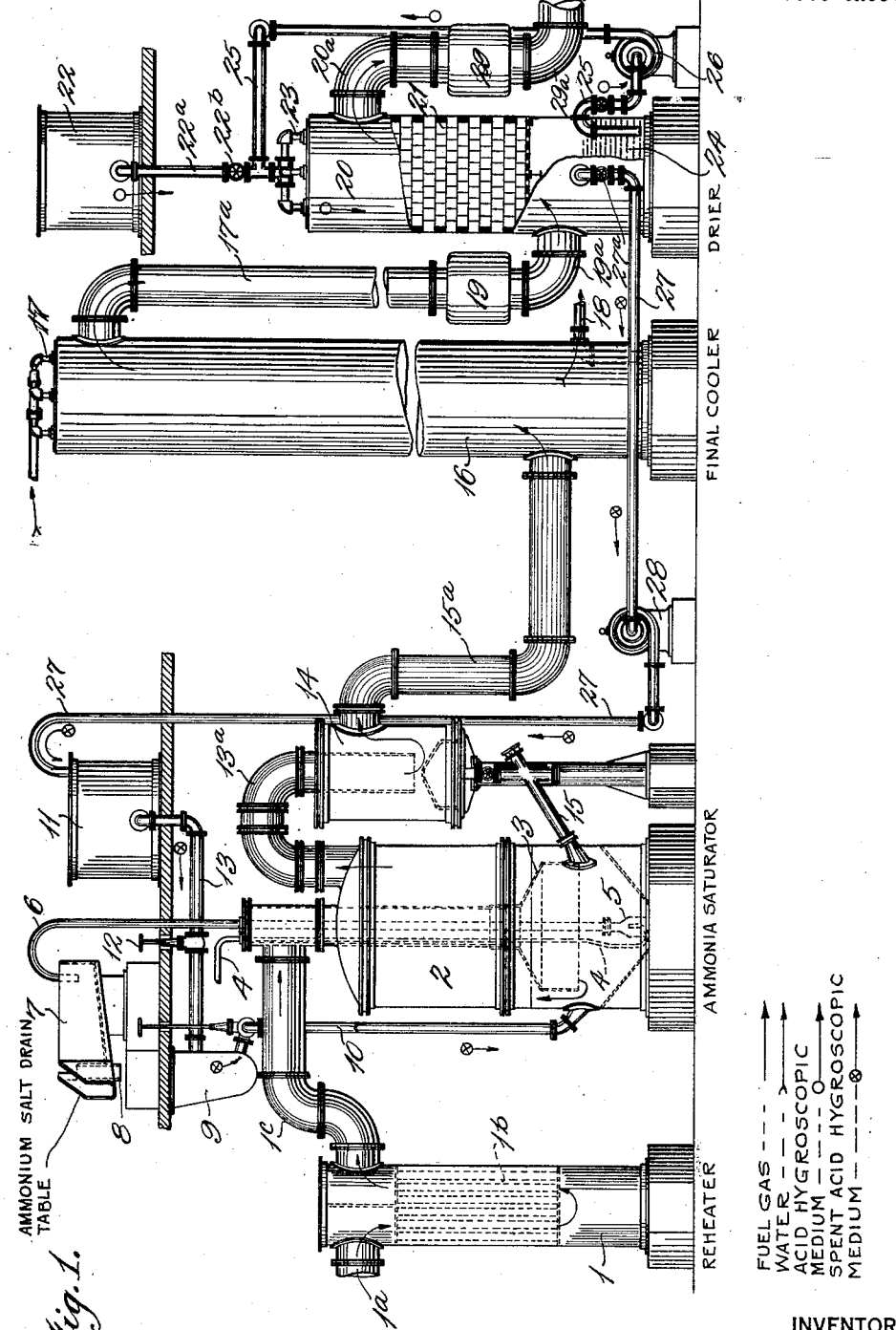
Fig. 1 is a side elevation of an apparatus for removing the ammonia from coal gas, cooling the gas and subsequently removing the moisture from said gas, the apparatus constituting one preferred embodiment of the invention.
Figure 2:
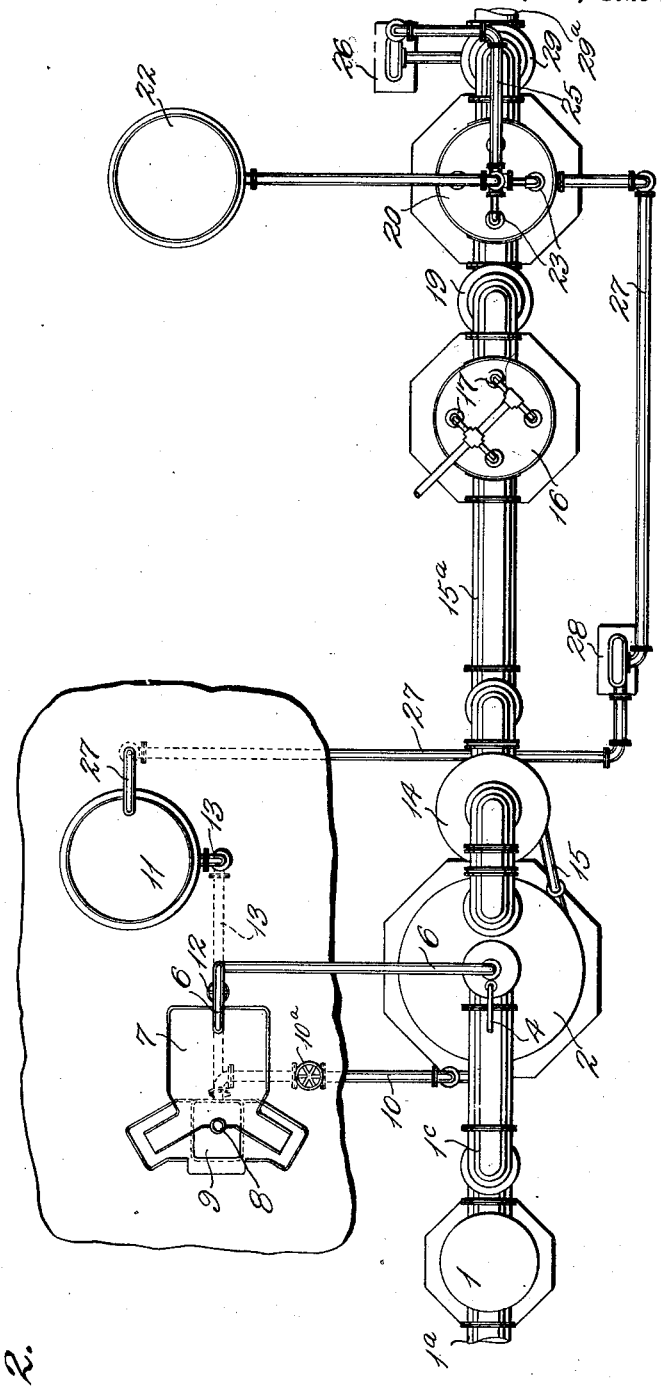
Fig. 2 is a plan view of the same.

Referring to the drawings, and with particular reference to Figs. 1 and 2, the relatively cool coal gas from which the suspended tar has been removed by suitable means, enters the apparatus through a pipe or conduit 1a and passes into a reheater 1. The relatively cool gas entering the re-heater contacts with and circulates externally around suitable steam coils 1b therein and is thereby raised to a temperature of substantially 60° C. From the re-heater 1 the heated coal gas passes through the connection 1c into a saturator 2. The latter is of usual or preferred type having contained therein a bell distributor 3 provided with suitable slots, perforations or serrations in the lower portion thereof through which the gas escapes directly into a bath of acid, which for purposes of illustration will be herein described as consisting of dilute sulphuric acid. The ammonia present in the coal gas reacts with the sulphuric acid forming ammonium sulphate which is deposited in crystalline form in the bottom of the saturator 2. Air under pressure is admitted to the saturator through a pipe 4 extending at its lower end into an ejector 5, by means of which the sulphate crystals are forcibly discharged, together with a portion of the acid in the bath, through the pipe line 6 and upon the trough or drain table 7. The ammonium sulphate crystals are continuously accumulated upon the drain table 7 and are removed at intervals by an attendant and deposited into suitable means, usually centrifugal separators (not shown), where the crystals are dried. The acid draining from the table 7 is discharged through the drain pipe 8 into a drip pot 9 and is preferably passed by means of the pipe or drain line 10, controlled by the valve 10a, back into the saturator 2 for further use in the removal of ammonia from the coal gas. The source of acid supply for the saturator 2 is contained in a suitable tank 11 and may be admitted to the saturator at the discretion of the operator by means of the valve 12. The replenishing supply of acid passes through the pipe 13 into the drip pot 9 and thence through the pipe 10 into the saturator, and the operator is thereby enabled to visually ascertain the amount of acid drawn from the tank 11.

The coal gas which is now substantially free of ammonia, is passed from the saturator through the connection 13a into an acid separator 14 of usual or preferred type. The acid content of the ammonia-free gas is removed by centrifugal action within the separator 14, collected in the conical bottom thereof, and is returned to the saturator by means of the drain pipe or connection 15. The gas which is now free from ammonia and particles of acid, is passed through the connection 15a into the final cooler 16 where it is thoroughly washed and cooled by means of water admitted through the sprays 17. The cooling water from the sprays 17 trickles down through the filling medium in the cooling tower 16 in intimate contact with the gas and thereafter escapes from the cooler through the seal pipe 18. The gas which has been cooled to a temperature of substantially 25° C., passes from the upper end of the final cooler 16 through the pipe connection 17a and any suspended water in the gas is removed by means of the water separator 19, which may be of the centrifugal type.

The cooled gas is now ready for the dehydrating or drying operation and is passed from the separator 19 through the connection 19a into the lower portion of a drier 20. The latter is provided in its intermediate interior portion with a suitable packing material 21, which may consist of acid-proof stoneware tiles, as illustrated, or such packing may consist of pieced coke or other suitable material which is not reactive with the hygroscopic acid employed. The acid employed for the drying operation is contained in a suitable storage tank 22 and in the described embodiment of the invention, consists of sulphuric acid having a relatively high concentration of 60° Baumé or higher. Satisfactory results have been obtained by the use of acid having a concentration of 66° Baumé. The concentrated acid is admitted by gravity to the drier 20 through the pipe 22a controlled by the valve 22b, and sprays 23, from whence it is distributed upon the non-reactive filler 21 within the drier. The acid trickles downwardly through and over the filling medium in intimate contact with the gas admitted through the pipe connection 19a, and by reason of its hygroscopic properties absorbs all water contained within said gas. The gas from which all moisture has been removed by contact with the acid in the drier 20 is passed through the pipe or conduit 20a, to a suitable acid separator 29 where all particles of acid in suspension in the gas are removed, the gas being thereafter passed through the connection 29a directly into the gas main or into a suitable storage tank, to be thereafter utilized for various purposes heretofore described.

The acid which has absorbed the moisture from the gas in the drier 20 passes downwardly into the lower portion 24 of the drier, which portion is preferably constructed as to constitute a sump for the accumulation of the acid. Acid of higher concentration in the sump 24 may be removed by means of a pump 26 and returned through the pipe 25 to the sprays 23, from whence the acid is again circulated through the drier 20, for contact with the moist gas in the manner stated. Acid in the sump 24 which has become diluted by the moisture absorbed from the gas, may be drawn off from the surface of the sump through the pipe 27, controlled by the valve 27a, and this acid is forced by the pump 28 through the pipe 27 and into the storage tank 11. From the tank 11 the dilute acid is employed for the removal of ammonia from the gas heretofore described as taking place prior to the operation of moisture removal in the drier.

Figure 3:
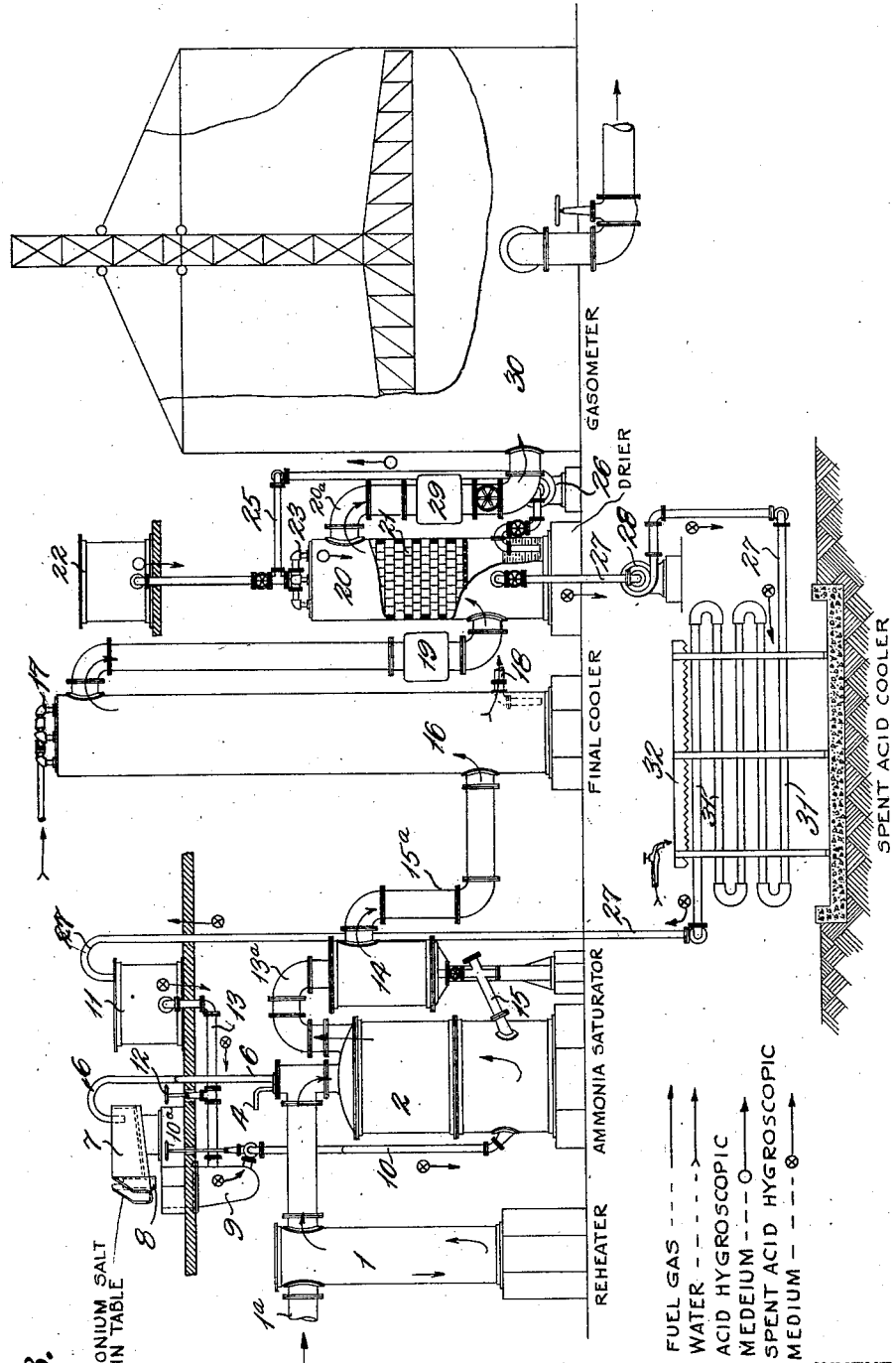
Fig. 3 is a side elevation similar to Fig. 1 and illustrating means for cooling the dehydrating or hygroscopic liquid and means for accumulating and storing the purified coal gas.
Figure 4:
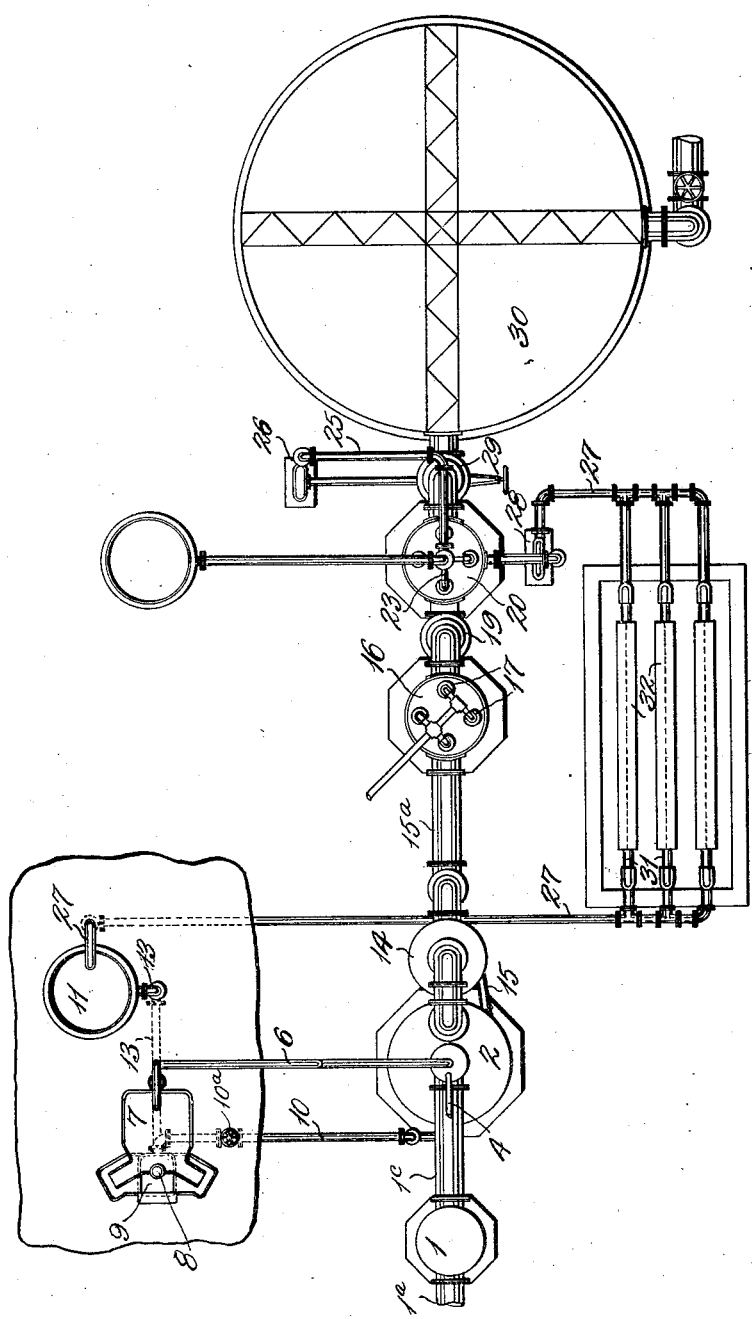
Fig. 4 is a plan view of the same.

Referring to Figs. 3 and 4, there are shown means for storing coal gas after the same has been purified and the ammonia and water removed therefrom. The purified dry gas passes from the drier 20 through the acid separator 29 into a waterless gas holder 30. A holder of this type has been found to possess advantages incident to the present invention which are not attendant upon the older type of gas holder in which a water or oil seal is commonly used. A waterless gas holder of the type illustrated and used in connection with the present invention and illustrated in Figs. 3 and 4, is fully described in U. S. Patents Numbers 1,275,696 and 1,481,099 of Konrad Jagshitz, and it is not thought necessary to describe the same in detail herein.

With further reference to Figs. 3 and 4, means are shown for cooling the acid which has become diluted in the drier 20, and prior to its employment for removing ammonia from the gas in the saturator 2. In this manner any undesirable heat liberated by the dilution of the acid in the drier 20 may be eliminated. Such cooling means constitute suitable coils 31 through which the dilute acid is circulated by the pump 28, said coils being externally cooled by means of water distributed over the coils from the distributing troughs 32. The undesirable heat present in the dilute acid is thereby eliminated prior to the reception of the acid in the storage tank 11 above the saturator 2. If desired, such cooling may be accomplished by means of water cooling coils embodied within the drier 20. The embodiment illustrated has been found to render desirable and satisfactory results.

Figure 5:
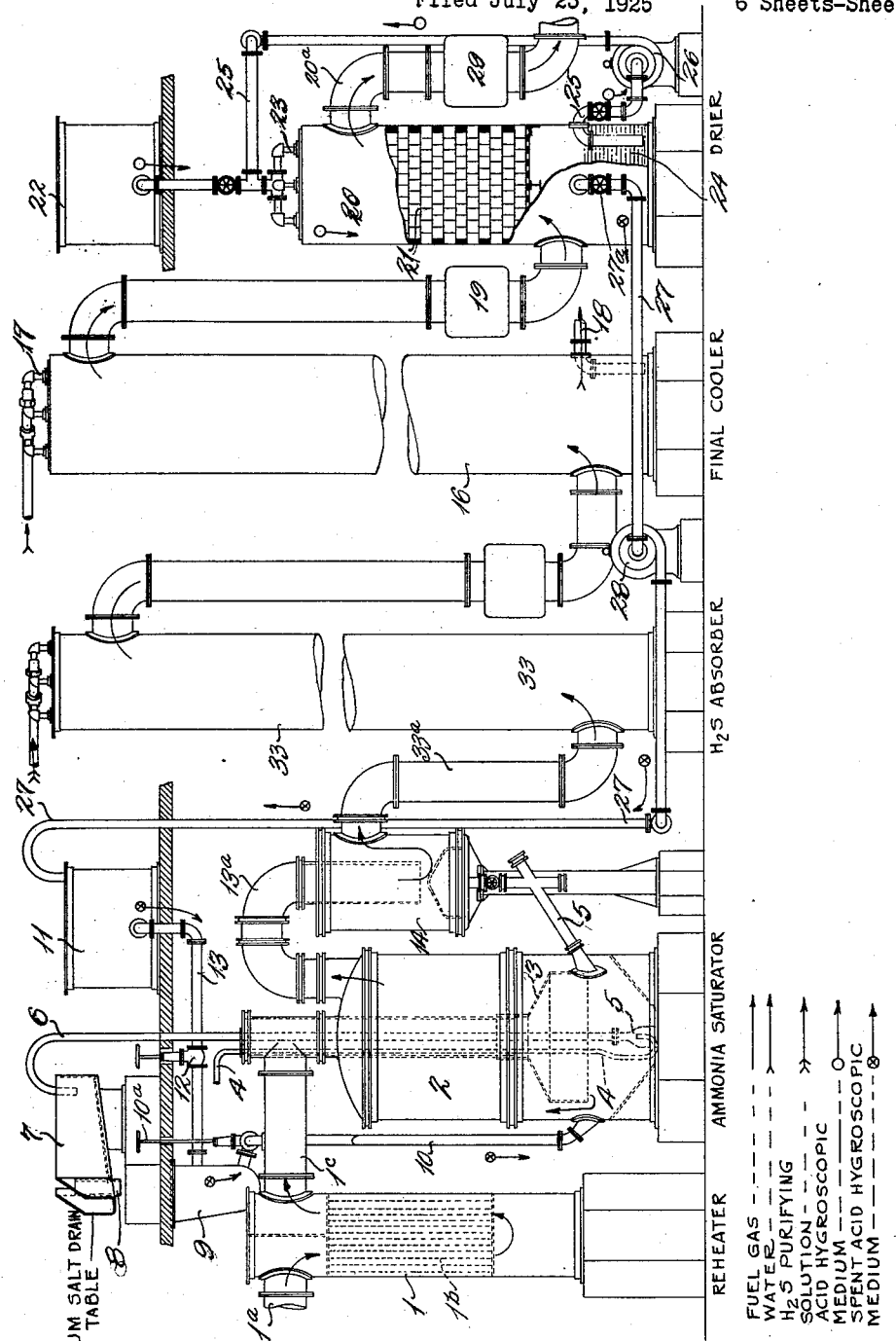
Fig. 5 is a view similar to Fig. 1 and showing means for additionally purifying the coal gas after the removal of ammonia from the same and prior to the dehydrating or drying operation.
Figure 6:
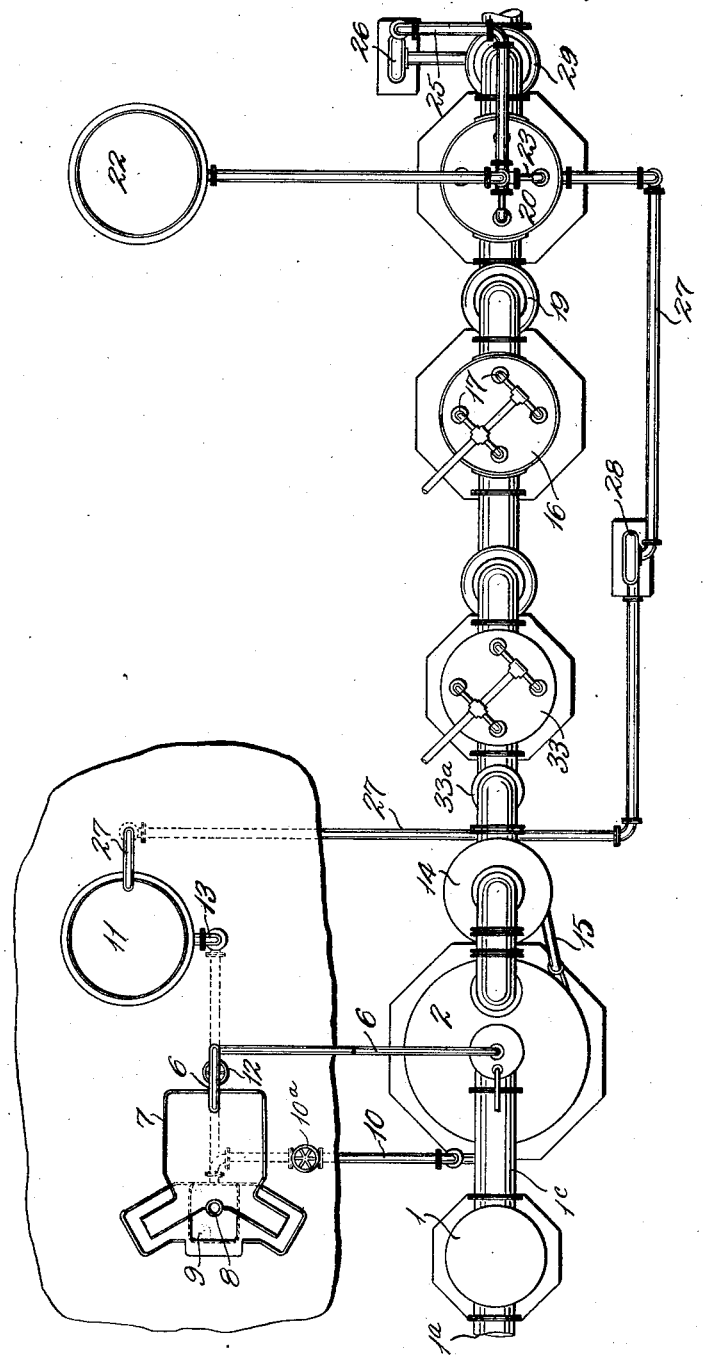
Fig. 6 is a plan view of the same.

Referring to Figs. 5 and 6, means are illustrated for removing other impurities from the gas as well as the ammonia and water. After the ammonia has been removed from the gas, and when desired certain other impurities, such as hydrogen sulphide and hydrogen cyanide, may be removed therefrom. These means are illustrated as consisting of an absorbing tower 33 into which the gas is introduced from the separator 14 through the pipe connection 33a immediately after the ammonia has been removed from the gas. The absorbing tower 33 comprises the absorption stage of liquid purification systems fully described and claimed in the following co-pending applications: Serial No. 21,983, filed April 9, 1925; Serial No. 21,982, filed April 9, 1925; Serial No. 520,807, filed December 8, 1921; Serial No. 21,979, filed April 9, 1925; and Serial No. 718,253, filed June 6, 1924.

The actification stage in the liquid purification systems described in the above noted applications is not directly concerned with the travel of the gas or acid through the system disclosed in the present invention. The particular means for accomplishing such actification, after the absorption of impurities such as hydrogen sulphide and hydrogen cyanide in the absorption tower 33, have not therefore been described or illustrated in detail. While the absorbing tower 33 has been illustrated in the apparatus as disposed prior to the entrance of the gas into the final cooler 16, the same may be installed in the system, when desired, after the final cooler 16 and prior to the entrance of the gas into the drier 20.

A dry purification system such as a series of trays containing iron oxide, may be substituted for the liquid system embodied in the tower 33. Since the reactions incident to the system of dry purification produce moisture, it is preferable in both instances to purify the gas prior to the removal of moisture from the same.

One practical illustration of the process of carrying out the present invention is as follows: A by-product coke oven plant carbonizing 1,000 tons of coal per day will produce approximately 11,000,000 cubic feet of coal gas to be purified and relieved of all moisture. This gas, having an initial saturation with water vapor of substantially 70° Fahr., may be dried to a dew point of 30° Fahr. by means of 25,000 lbs. of hygroscopic acid, for instance sulphuric acid at a concentration of 60° Baumé. The sulphuric acid at this concentration may be utilized in the saturator for the recovery of ammonia. Extra steam may be utilized in the re-heater to take care of the moisture absorbed by the acid. Approximately 10,000 lbs. of steam per day is sufficient under the conditions stated.

As a further illustration and for the same amount of gas (11,000,000 cubic feet), 21,000 lbs. of sulphuric acid at 66° Baumé is sufficient to dry the gas to a dew point of 30° Fahr. The acid will be diluted by contact with the gas to a concentration of 55.5° Baumé and when this acid is used in the saturator for the elimination of ammonia in the gas, the amount of additional steam required is substantially 5900 lbs. per day.

In either of the above cases, the drying of the gas is accomplished by the expenditure of the additional steam noted, as the acid is used for the dual purpose of drying the gas and recovering the ammonia therein.

After the gas leaves the re-heater the hygroscopic medium, such as sulphuric or phosphoric acid, effects both the removal of the ammonia and all moisture remaining in said gas, including such moisture as is taken up during the washing of the gas in the cooler 16. While in the present illustration of the invention sulphuric acid is employed as the dehydrating medium, it is to be understood that any liquid that is strongly hygroscopic and capable of reacting suitably with ammonia, may be used. In the event that phosphoric acid is employed in the manner illustrated as utilizing sulphuric acid, the ammonia is thereby recovered as ammonium phosphate.

The invention has been illustrated and described in connection with the "direct" or "semi-direct" process of ammonia recovery, and it is to be understood that the invention is not to be limited to this particular process. The invention may be carried out with equally desirable and beneficial results for the recovery of ammonium sulphate in any of the "indirect" processes as practised at present. In the "direct" process, and as described above, the gas is cooled for tar extraction, the tar is then extracted, and the gas is re-heated and is passed through a bath of sulphuric acid, where the ammonia is recovered in the the form of ammonium sulphate. In the "indirect" processes, the gas is cooled, the tar extracted, and the gas is thereafter washed with water which absorbs the free ammonia. The resulting ammonia liquor is distilled and passed into a saturator for the recovery of sulphate. In the latter system, the acid that is employed to dry the gas is utilized in the saturator where it is employed to condense practically pure ammonia vapors, whereas in the "direct" system as herein illustrated and described the acid is employed to remove the ammonia vapors directly from the gas and prior to the washing of the gas with water.

It will be apparent from the foregoing that the dilute acid obtained by the dehydration of the gas is employed for the purpose of removing the ammonia from said gas prior to the dehydrating operation, and a simplified and effective apparatus is provided for continuously and economically removing from the coal gas all moisture, ammonia and other recoverable constituents, the presence of which would otherwise render the coal gas of no practical value in distribution systems designed solely for natural gas, as well as for other useful purposes which have been hereinabove set forth.

It is to be further understood that in the performance of the processes herein described, all means or apparatus which comes into contact with the acid employed in removing the ammonia and moisture from the gas are constructed of non-reactive and acid-proof materials. For example, lead linings may be employed in all vessels, piping, pumps, valves and other parts.

The invention as hereinabove set forth or exemplified may be variously practiced or embodied within the scope of the claims hereinafter made.

What is claimed is:—

1. A process of treating fuel gas which comprises: recovering ammonia from such gas by passing a continuous stream of such gas through an acid saturation bath to give up its ammonia to free acid therein; thereafter absorbing moisture from the ammonia-free gas stream by passing a continuous stream of said gas into contact in a vessel with concentrated hygroscopic acid which will form an ammoniacal salt in a saturation bath; discharging and accumulating spent acid from said vessel; and substantially constantly conducting spent acid from the accumulation thereof to said acid saturation bath.

2. A process of treating fuel gas which comprises: recovering ammonia from said gas by passing a continuous stream of said gas through a dilute sulphuric acid saturation bath to precipitate ammonium sulphate therein; thereafter removing moisture from the ammonia-free gas stream by passing a continuous stream of said gas into contact in a vessel with moisture absorbing concentrated sulphuric acid moving continuously through said vessel; constantly discharging and accumulating the spent acid from said vessel; and conducting spent acid from the spent accumulation to said saturation bath to maintain a constant supply of acid therein.

3. A process as claimed in claim 2 and in which the moisture absorbing concentrated sulphuric acid has a concentration of at least 60° Baumé.

4. A process as claimed in claim 2 and in which the moisture absorbing concentrated sulphuric acid has a concentration of 66° Baumé.

5. A process as claimed in claim 2 and which includes the step of cooling dilute spent acid that is conducted to the saturation bath prior to its entry into said bath.

6. A process of treating fuel gas which consists in: recovering ammonia from such gas by passing a continuous stream of such gas in contact with a dilute sulphuric acid saturation bath; then removing impurities from said gas by absorption and reaction while passing the continuous stream of gas through an impurity absorption and reaction chamber; thereafter removing moisture from said gas by passing said gas stream in contact in a vessel with sulphuric acid in concentrated form; discharging and accumulating spent acid from said vessel; returning to said vessel for removal of moisture from gas therein, spent concentrated acid discharged and accumulated therefrom; and conducting to said saturation bath for reaction with ammonia therein, spent dilute acid discharged and accumulated from said vessel.

7. In a process of treating gas, the improvement which consists in treating an ammonia charged gas with spent acid hygroscopic medium from the hereinafter defined moisture absorbing operation to recover the ammonia as ammonium compound crystals and then treating the ammonia-freed gas with an acid hygroscopic medium to absorb moisture therefrom.

8. In a process of treating gas, the improvement which consists in treating an ammonia charged gas with spent sulphuric acid from the hereinafter defined moisture absorbing operation to recover the ammonia as ammonium sulphate and then treating the ammonia-freed gas with sulphuric acid to absorb moisture therefrom.

9. A process of treating fuel gases which comprises bringing a continuous stream of fuel gases at a pressure at which they are to be distributed and a temperature not materially below atmospheric temperature, in contact with a body of water absorbing material in a liquid state and withdrawing the substantially dehydrated fuel gases.

10. An apparatus for purifying gas comprising in combination: a gas re-heater, a saturator, means for supplying dilute acid to said saturator, means for conducting gas to be purified to said re-heater and therefrom to said saturator to contact with said acid, means for removing the formed ammonium salts and a portion of the acid from said saturator, means for returning said acid portion to said saturator, centrifugal means for removing the acid content from said gas from said saturator, means for returning said removed acid from said centrifugal means to said saturator, means for cooling said gas communicably connected with said centrifugal means, means for separating the cooling medium from the gas from said cooling means, a drier communicably connected with said separator and said cooling means, means for supplying concentrated acid to said drier, means for separating said acid from the gas from said drier, means for continuously circulating the said concentrated acid within said drier, means for conducting acid which has become diluted by said moisture to the source of acid supply for said saturator, and means for cooling said dilute acid from said drier prior to its admission to the source of supply for said saturator.

11. An apparatus for purifying coal gas comprising in combination: a saturator, a storage tank for supplying dilute sulphuric acid to said saturator, means for conducting gas to be purified to said saturator to contact with said acid, an ejector for removing the formed ammonium salts and a portion of the acid from said saturator, means for returning said acid portion to said saturator, a centrifugal separator for removing the acid content from gas from said saturator, means for returning the acid from said separator to said saturator, means for cooling said gas communicably connected with said separator, a dehydration drier communicably connected with said cooling means, a second storage tank for supplying concentrated sulphuric acid to said drier, means for continuously circulating said concentrated acid within said drier, means for cooling a portion of dilute acid from said drier, and means for conducting said cooled acid to said first mentioned storage tank.

12. An apparatus for purifying coal gas, comprising in combination: means for heating the gas, a saturator, means for supplying dilute sulphuric acid to said saturator, means for ejecting the ammonia salts from said saturator, means for cooling gas from said saturator, a drier communicably connected with said saturator for flow of gas therefrom and adapted for hygroscopic dehydration of gas; means for supplying concentrated sulphuric acid to said drier, means for conducting a dilute portion of sulphuric acid from said drier to the means for supplying acid to said saturator, means for continuously circulating spent concentrated sulphuric acid within said drier for the further contact with gas therein, and means for cooling the portion of dilute acid that is to be conducted to the supplying means to said saturator, prior to the entry of said dilute acid into said saturator.

In testimony whereof I have hereunto set my hand.

CHARLES J. RAMSBURG.